UNITED STATES PATENT OFFICE.

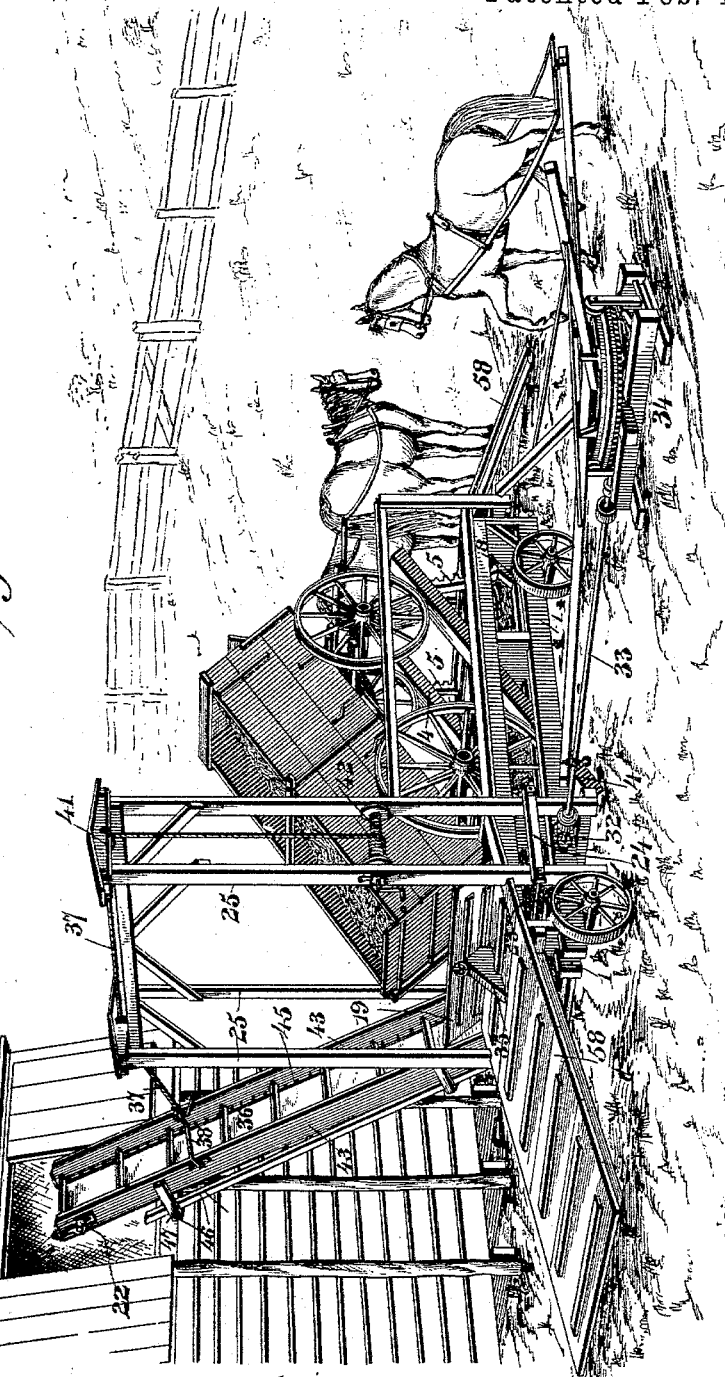

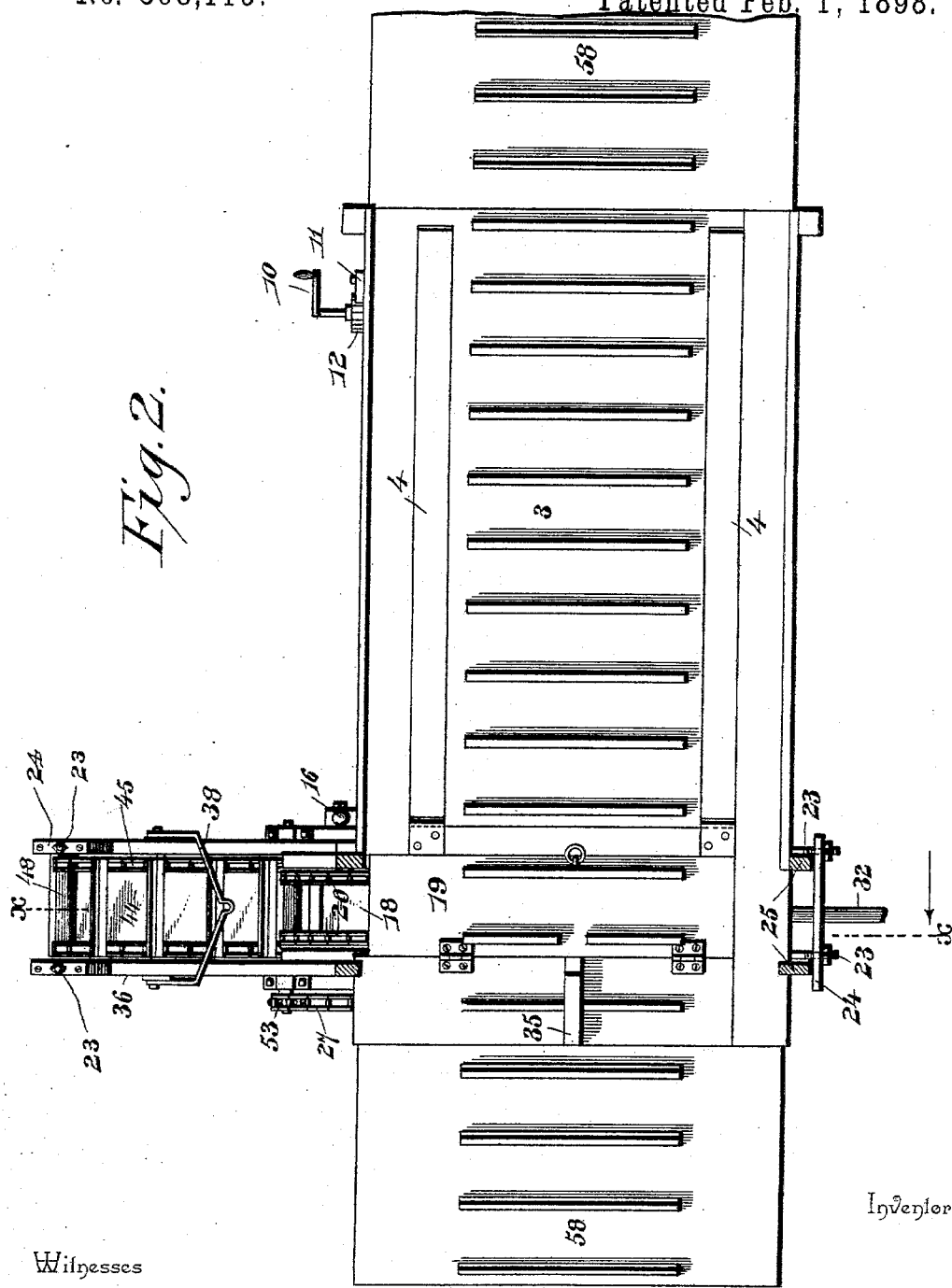

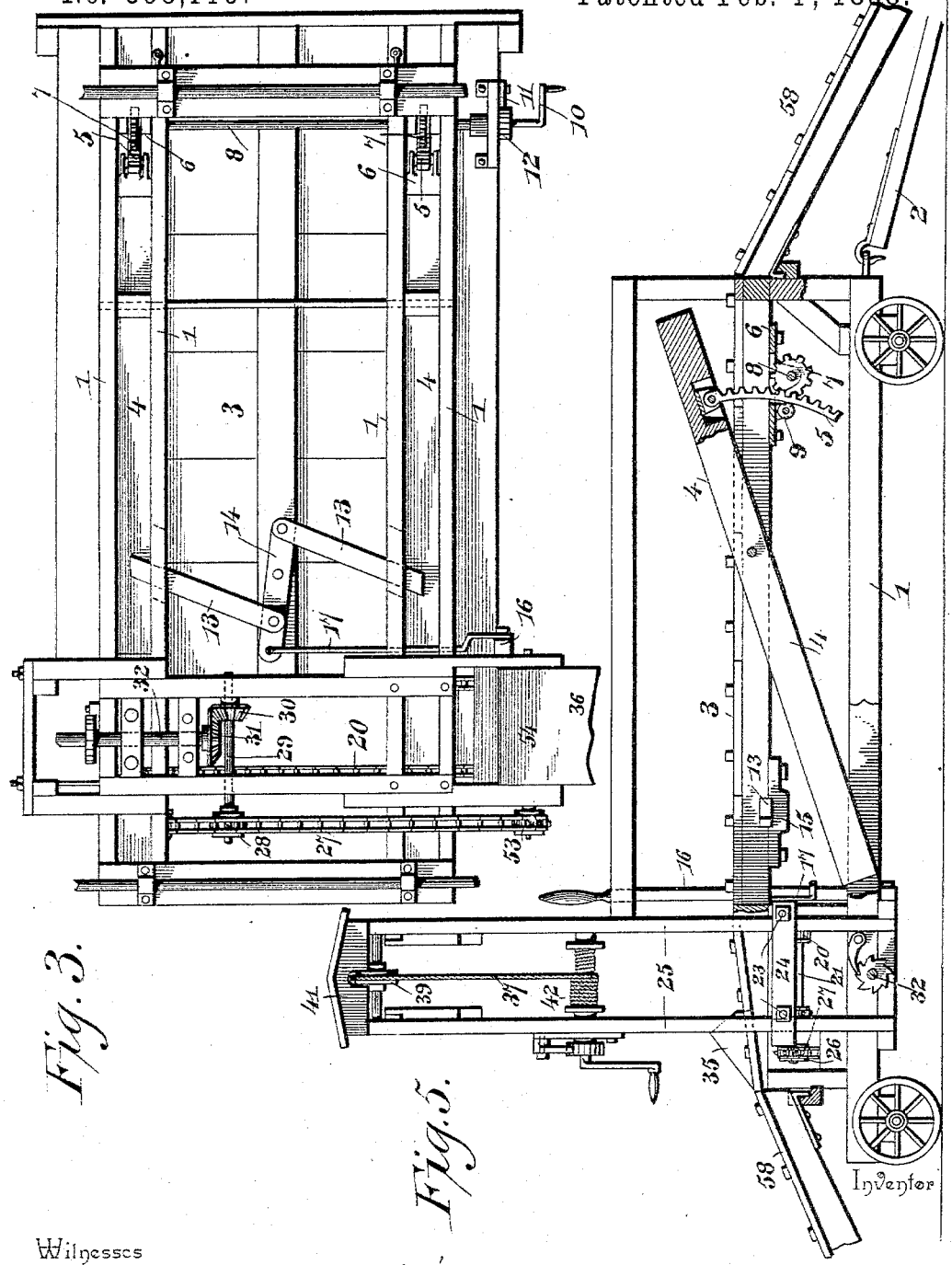

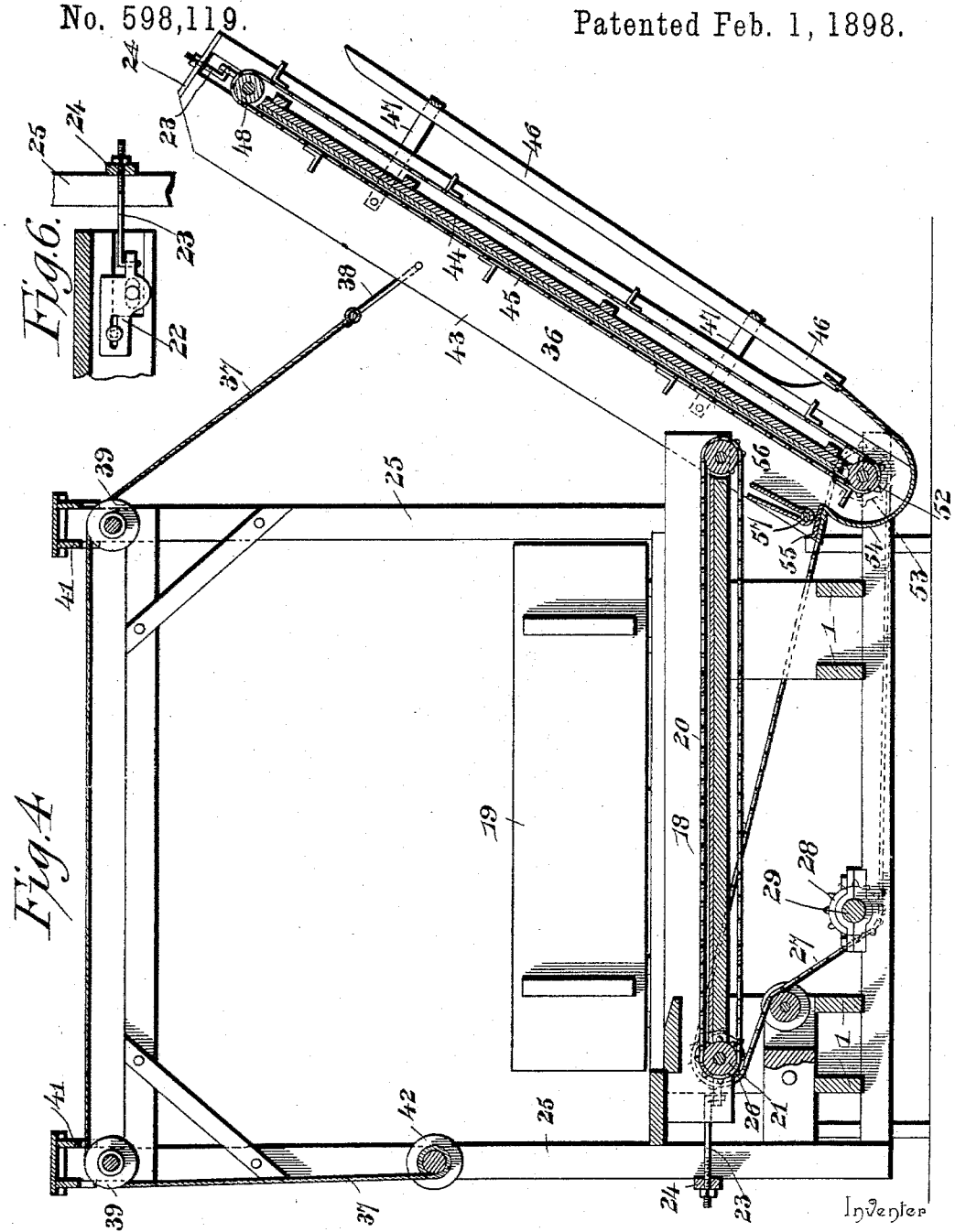

HENRY V. SCHRODER, OF MINIER, ILLINOIS.

LOADING OR UNLOADING MACHINE.

SPECIFICATION forming part of Letters Patent No. 598,119, dated February 1, 1898.

Application filed April 9, 1897. Serial No. 631,432. (No model.)

*To all whom it may concern:*

Be it known that I, HENRY V. SCHRODER, a citizen of the United States, residing at Minier, in the county of Tazewell and State of Illinois, have invented a new and useful Loading or Unloading Machine, of which the following is a specification.

This invention relates to apparatus for loading and unloading grain, and is designed more particularly for elevating grain from a wagon and depositing the same in a bin or granary, thereby lessening the manual effort and rendering comparatively easy the work of storing grain after harvesting. The apparatus is portable, so as to be moved from place to place, according to the location of the grain or granary into which the harvest is to be stored.

In its general construction the apparatus comprises a platform mounted upon a truck and having an approach and a descent at its ends, over which the team and wagon to be unloaded pass without any interruption, tilting beams at the sides of the platform for tipping the wagon to effect a discharge of the load, a locking and controlling mechanism for the tilting beams, a pit at one end of the platform to receive the load from the wagon, a conveyer traveling through the pit for moving the load to one side of the apparatus, an elevator for receiving the load from the conveyer and depositing it in the bin or granary, and means for raising and lowering the outer end of the elevator to adapt it to the height of the bin or granary, all as will appear more fully hereinafter, and be particularly set forth in the claims.

The improvement consists of the novel features and combinations of parts set forth in the subjoined description and illustrated in the drawings hereto attached, and reference is to be had thereto for a full understanding of the merits and advantages of the invention.

The improvement is susceptible of various changes in the form, proportion, and the minor details of construction without departing from the principle or sacrificing any of the advantages thereof, and to a full disclosure of the invention an adaptation thereof is shown in the accompanying drawings, in which—

Figure 1 is a perspective view showing the invention as it will appear when in operation. Fig. 2 is a top plan view of the apparatus, the uprights being in section. Fig. 3 is a bottom plan view, the treads being omitted. Fig. 4 is a transverse section on the line X X of Fig. 2, looking in the direction of the arrow. Fig. 5 is a side elevation, parts being broken away, showing the beams tilted. Fig. 6 is a detail view of the means for taking up slack in the carrier and elevator belts.

Corresponding and like parts are referred to in the following description and indicated in the several views of the accompanying drawings by the same reference characters.

The operating mechanism is mounted upon a truck 1 of suitable design and size to receive it, and this truck, as shown, comprises pairs of longitudinal sills connected at or near their ends by transverse beams and is moved from place to place by hitching a team to the pole or tongue 2, connected with the front axle. A platform 3 is supported upon the truck and is provided at its sides with tilting beams 4, located a distance apart and of such width as to receive the wheels of an ordinary farm-wagon. These beams 4 are fulcrumed intermediate of their ends and come flush with the platform, and toothed bars 5 have pivotal connection at their upper ends with the rear portions of the said beams and operate through openings in plates 6, secured to the under side of the sills supporting the platform. These bars 5 are curved in the direction of their length and intermesh with pinions 7, secured to a transverse shaft 8, journaled in bearings formed with or applied to the plates 6. The bars 5 are held in engagement with the pinions 7 by rollers 9, mounted upon pins supported at their ends in ears pendent from the plates 6. By operating the shaft 8 the tilting beams 4 can be moved positively toward and from the horizontal, as required, and for this purpose the shaft 8 is supplied at one end with a crank 10, and in order to hold it at any desired position a pawl 11 is provided to engage with a ratchet-wheel 12, secured upon the part 8.

The tilting beams 4 are secured at their rear ends by locking-bars 13, pivotally connected at their inner ends to a lever 14 and having their outer ends supported by keepers 15, secured to the substructure of the platform 3. The outer extremities of the locking-bars are adapted to be projected across and beneath the tilting beams, thereby holding the latter in a horizontal position. An operating-lever 16 is connected with the lever 14 by a rod 17 and is located at one side of the apparatus, so as to be within convenient reach to be operated when it is required to release the tilting beams by withdrawing the locking-bars from beneath them, thereby permitting the wagon with its load to tilt, as clearly indicated in Fig. 1.

A pit 18 is formed at the rear end of the platform and is closed by a cover 19, and an endless conveyer 20 operates therein, so as to move the load to one side of the machine, said conveyer being supported upon rollers at the extremities of the pit and consisting of sprocket-chains joined by transverse slats or bars, said sprocket-chains receiving spurs provided on one of the supporting-rollers, whereby the conveyer is positively driven. One of the rollers supporting the endless conveyer, as 21, is mounted in bearings 22, having slidable connection with the substructure of the platform, whereby it can be moved to take up any slack in the conveyer, the bearings having apertured extensions to receive the bent ends of hooked rods 23, having their outer ends threaded and passing through a bar 24, connecting the lower portions of uprights 25 and receiving nuts by means of which the said rods 23 and the bearings 22, connected therewith, are adjusted to attain the desired end. A sprocket-wheel 26 is secured to the shaft or journal of the roller 21 and receives a sprocket-chain 27, by means of which the endless conveyer and the elevator are driven. The sprocket-chain 27 intermeshes with a sprocket-wheel 28, secured to a counter-shaft 29, journaled longitudinally of the machine in bearings provided on the transverse sills of the truck-frame, said counter-shaft having a bevel-pinion 30 intermeshing with a corresponding bevel gear-wheel 31 on a shaft 32, connected by means of a tumbling-rod 33 with a horse-power 34, of usual construction. Obviously any power may be applied for turning the shaft 32 to operate the elevator and the conveyer. The cover 19, when open rests against a block 35 and serves as a deflector to direct the grain into the pit 18 when dumping the load, as will be readily understood.

The elevator 36 is pivoted at its lower end to the projecting ends of transverse sills at the rear end of the truck and is located in line with the pit 18 and endless conveyer 20 and is adapted to be raised and lowered at its outer or free end to adapt it to the height of the bin or granary into which the load is to be discharged. This elevator may be of any desired length and may be composed of sections in the usual manner, so as to admit of it being lengthened or shortened, and is raised and lowered at its free end by means of a cord or chain 37, connected at one end to a bail 38, applied to the elevator and passing over direction-pulleys 39 at the upper ends of uprights 25, secured at their lower ends to the truck frame and platform and connected at their upper ends by transverse bars 41, the opposite end of the cord or chain having connection with and adapted to be wound upon a windlass 42, journaled to a pair of uprights 25 and operated in the usual manner and supplied with the ordinary ratchet and pawl to hold the elevator at the adjusted position. The elevator comprises side pieces 43, a connecting plate or board 44, an endless conveyer 45 of ordinary construction and consisting of side chains and transverse connecting slats or bars of L form and so disposed as to sweep over the plate or board 44 and prevent the escape of loose grain, rollers at the ends of the plate or board for the endless conveyer to travel over, and guards 46, the latter consisting of strips or bars located beneath the plate or board 44 and connected with the side pieces 43 by brackets 47, said guards supporting the lower portion of the endless conveyer 45 and preventing any one from coming in contact therewith. The roller 48 for the upper end of the endless conveyer 45 is journaled in adjustable bearings 22, which are moved by hooked rods 23, having their bent ends in engagement with apertured extensions of the bearings and having their outer threaded ends passing through openings in plates 24, spanning notches in the ends of the side pieces 43 and receiving nuts on their projecting ends, by means of which the hooked rods and the bearings are adjusted so as to take up any slack in the endless conveyer 45. The lower roller 52 has spur-teeth to engage with the sprocket-chains of the endless conveyer 45, and its journals project beyond the sides 43 and obtain bearings on the extended sills of the truck-frame and pivotally support the elevator, one of the journals having a sprocket-wheel 53 secured thereto which receives the drive-chain 27, whereby the elevator is operated. The lower end of the elevator projects beneath the delivery end of the endless conveyer 20, so as to receive the grain or load delivered thereby to one side of the machine, and in order that the grain may be taken up by the endless conveyer 45 the lower end of the elevator is made rounding and is closed in by a housing 54, which is a plate bent around the lower extremities of the sides 43 and secured at one end to the lower extremities of the guards 46 and at its opposite end to a cross-bar 55, secured to the upper corners of the sides 43, as clearly indicated. A plate 56 extends across the space formed between the lower end of the elevator and the truck and is pivotally supported upon a transverse rod 57, having its ends let into the sides of the elevator-frame and located just in front of the cross-bar 55, the latter normally supporting and holding the plate 56 in proper position for effecting the desired end. This plate 56 is constructed of a sheet-metal blank folded upon itself, the fold receiving the rod 57 and the lower portion of the plate engaging with the cross-bar 55. This plate 56 prevents the wasting of any grain through the space which would otherwise exist between the delivery end of the conveyer and the receiving end of the elevator and provides for ready access to the housing 54 to remove any obstructing matter therefrom or for any desired purpose.

The treads 58 are of similar construction and constitute the approach and descent from the platform, whereby the team can ascend to the platform at one end and depart by way of the opposite tread after the load is dumped, the treads having hooks to engage with notched bars at the ends of the truck, whereby the treads may be readily detached when it is required to move the apparatus from one place to another or to reduce its size for storing.

The wagon to be unloaded is drawn upon the platform with its wheels resting upon the tilting beams 4, after which the cover 19 is thrown back against the block 35, and the beams being released tilt and incline the wagon, as clearly indicated in Fig. 1, when by removing the tail-gate the load will dump into the pit 18 and will be moved to one side of the apparatus by the action of the endless conveyer 20 and will be dumped into the bin or granary by the elevator in the manner set forth.

Having thus described the invention, what is claimed as new is—

1. In a portable loading and unloading apparatus, the combination of a truck having treads at its ends and provided intermediate of its ends with a tilting support for the wagon, a pit at one end of the truck, a cover for closing the pit and limited in its opening movement to form a deflector, an endless conveyer operating in the bottom of the pit to discharge the load at one side, an elevator in line with the conveyer to receive the load therefrom, uprights in line with the pit and connected at their upper ends, a cord or chain having connection at one end with the elevator and passing over direction-pulleys supported by the uprights, and a windlass journaled to a pair of the uprights and adapted to have the said cord or chain wound thereon for adjusting the free end of the elevator, substantially as set forth.

2. In a portable loading and unloading machine, the combination of a truck having treads at its ends and provided with a platform having a tilting support to receive the wagon containing the load to be discharged, a pit at one end of the platform, a cover for closing the pit and adapted when thrown back to form a deflector or guard, a centrally-disposed block limiting the opening of the cover, a conveyer operating through the pit to move the load dumped therein to one side of the machine, and an elevator at one side of the machine to receive the load from the said conveyer and discharge it into the required place of deposit, substantially as specified.

3. In a loading and unloading apparatus, the combination of a platform, tilting beams at the sides of the platform, toothed bars having pivotal connection with the tilting beams, plates having openings for the toothed bars to operate through, a transverse shaft mounted in bearings applied to the said plates and provided with pinions intermeshing with the toothed bars, and rollers supported by the plates and holding the toothed bars in engagement with the pinions of the transverse shaft, substantially as set forth.

4. In a loading and unloading apparatus, the combination of a tilting support, a transverse conveyer at one end of the tilting support, an elevator in line with the conveyer and having its lower end projecting below and beyond the delivery end of the said conveyer, a cross-bar 55, a transverse rod parallel with the cross-bar and supported by the sides of the elevator-frame, and a plate having a portion folded and mounted upon the said transverse rod and projecting across the space formed between the delivery end of the conveyer and the receiving end of the elevator, substantially as and for the purpose set forth.

5. In a loading and unloading apparatus, the combination of a tilting support, a transverse conveyer at one end thereof, an elevator in line with the transverse conveyer and having its lower portion projecting beneath the delivery end thereof and provided with a cross-bar, and a plate having pivotal connection with the sides of the elevator and supported by means of the said cross-bar, substantially in the manner set forth for the purpose described.

6. In a loading and unloading apparatus, the combination of a tilting support, a transverse conveyer at one end of the support, an elevator in line with the transverse conveyer and projecting beneath the delivery end thereof, and having a cross-bar, a rod located in advance of the said cross-bar and supported by the sides of the elevator, and a plate consisting of a blank doubled upon itself and receiving the rod in the fold, and having the lower portion supported by means of the said cross-bar, substantially as described.

7. In an apparatus of the character set forth, the combination of an endless conveyer, a roller supporting the conveyer at one end, adjustable bearings for the said roller having apertured extensions, hooked rods having their bent ends engaging with the apertured extensions of the bearings and having their opposite ends threaded and passing through a support, and adjusting-nuts applied to the projecting ends of the hooked rods, substantially as and for the purpose set forth.

In testimony that I claim the foregoing as my own I have hereto affixed my signature in the presence of two witnesses.

HENRY V. SCHRODER.

Witnesses:
VALENTIN IMIGTEN,
S. A. C. FREITAG.